(12) United States Patent
Xie et al.

(10) Patent No.: US 11,855,304 B2
(45) Date of Patent: Dec. 26, 2023

(54) SECONDARY BATTERY

(71) Applicant: Contemporary Amperex Technology Co., Limited, Ningde (CN)

(72) Inventors: Mianyu Xie, Ningde (CN); Guangjun Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 66 days.

(21) Appl. No.: 17/488,352

(22) Filed: Sep. 29, 2021

(65) Prior Publication Data

US 2022/0021085 A1 Jan. 20, 2022

Related U.S. Application Data

(63) Continuation of application No. PCT/CN2020/111451, filed on Aug. 26, 2020.

(30) Foreign Application Priority Data

Aug. 27, 2019 (CN) .......................... 201921404422.X (51) Int. Cl.
   *H01M 50/536* (2021.01)
   *H01M 50/105* (2021.01)
   *H01M 10/04* (2006.01)

(52) U.S. Cl.
   CPC ....... *H01M 50/536* (2021.01); *H01M 10/045* (2013.01); *H01M 50/105* (2021.01)

(58) Field of Classification Search
   CPC . H01M 50/536; H01M 50/105; H01M 10/045
   (Continued)

(56) References Cited

U.S. PATENT DOCUMENTS

| 2019/0157684 A1* | 5/2019 | Xing | H01M 4/70 |
| 2020/0006776 A1* | 1/2020 | Zhou | H01M 4/667 |
| 2020/0028127 A1* | 1/2020 | Seino | H01M 50/103 |

FOREIGN PATENT DOCUMENTS

| CN | 1242613 A | 1/2000 |
| CN | 101026250 A | 8/2007 |

(Continued)

OTHER PUBLICATIONS

The International search report for PCT Application No. PCT/CN2020/111451, dated Nov. 30, 2020, 11 pages.

(Continued)

*Primary Examiner* — Jonathan G Jelsma
*Assistant Examiner* — Omar M Kekia
(74) *Attorney, Agent, or Firm* — East IP P.C.

(57) ABSTRACT

Provided is a secondary battery, comprising an electrode assembly, a packaging bag, and electrode leads. The electrode assembly is accommodated in the packaging bag and comprises a first electrode member, a second electrode member and a separator. The separator separates the first electrode member from the second electrode member. The first electrode member comprises an insulating substrate, a conductive layer, an active material layer and a conductive structure. The conductive layer is provided on the surface of the insulating substrate, and the conductive layer is provided with a first portion and a second portion. The first portion is coated with the active material layer. The second portion is not coated with the active material layer. The conductive structure is welded to the second portion to form a first welding area. The electrode leads are connected to the conductive structure and extend to the outside of the packaging bag.

10 Claims, 6 Drawing Sheets

(58) Field of Classification Search
USPC .......................................................... 429/209
See application file for complete search history.

(56) References Cited

FOREIGN PATENT DOCUMENTS

| | | |
|---|---|---|
| CN | 208507818 U | 2/2019 |
| CN | 208820001 U | 5/2019 |
| CN | 209087968 U | 7/2019 |
| CN | 210136972 U | 3/2020 |
| EP | 2026402 A1 | 2/2009 |
| EP | 3073542 A1 | 9/2016 |
| JP | 2008016368 A | 1/2008 |
| JP | 2012185938 A | 9/2012 |

OTHER PUBLICATIONS

The extended European search report for EP Application No. 20857179.4, dated Feb. 18, 2022, 18 pages.

\* cited by examiner

FIG. 11

SECONDARY BATTERY

CROSS REFERENCE

The present disclosure is a continuation of International Application No. PCT/CN2020/111451, filed on Aug. 26, 2020, which claims the priority to Chinese patent application 201921404422.X titled "Secondary Battery" filed on Aug. 27, 2019, the entire content of which is incorporated herein by reference.

TECHNICAL FIELD

The present disclosure relates to the field of battery technology, in particular to a secondary battery.

BACKGROUND

As a secondary battery, a lithium-ion battery is widely used in portable electronic devices, such as a mobile phone and a notebook, and an electric vehicle, such as an electric car and an electric bicycle, due to their high energy density, high power density, many cycles of use, and long storage time.

The electrode members of the lithium ion battery are usually made of metal materials. For example, a positive electrode member is usually made of aluminum foil, and a negative electrode member is usually made of copper foil. However, in a nail penetration experiment, the positive electrode member and the negative electrode member will be short-circuited, causing fire and explosion of the lithium ion battery.

SUMMARY

In view of problems in the background art, a purpose of the present disclosure is to provide a secondary battery that can reduce a risk of short circuit and increase energy density.

To achieve the above purpose, the present disclosure provides a secondary battery, comprising an electrode assembly, a packaging bag, and electrode leads. The electrode assembly is accommodated in the packaging bag and comprises a first electrode member, a second electrode member and a separator that separates the first electrode member from the second electrode member. The first electrode member comprises an insulating substrate, a conductive layer, an active material layer and a conductive structure. The conductive layer is provided on a surface of the insulating substrate, the conductive layer is provided with a first portion and a second portion extending from the first portion, the first portion is coated with the active material layer, the second portion is not coated with the active material layer, and the conductive structure is welded to the second portion to form a first welding area. The electrode leads are connected to the conductive structure and extend to an outside of the packaging bag. A portion of the insulating substrate corresponding to the first portion and the first portion form a main body, and a portion of the insulating substrate corresponding to the second portion and the second portion form an electric guide portion. The electric guide portion is provided with an inclined area arranged obliquely with respect to the main body, and the first welding area is at least partially located in the inclined area.

In some embodiments, the first welding area and the first portion are spaced apart along an extension direction of the electric guide portion.

In some embodiments, the electrical guide portion is also provided with a transition area connected between the inclined area and the main body. The inclined area is bent toward the electrode leads relative to the transition area.

In some embodiments, a surface of the transition area is not covered by the conductive structure.

In some embodiments, the conductive layers are arranged on opposite side surfaces of the insulating substrate. The conductive structure comprises a first conductive member and a second conductive member connected to each other. The first welding area comprises a first sub-welding area and a second sub-welding area. The first conductive member is welded to an area of the second portion on a side surface of the insulating substrate to form the first sub-welding area, and the second conductive member is welded to an area of the second portion on the other side surface of the insulating substrate to form the second sub-welding area.

In some embodiments, the first conductive member extends beyond the second conductive member in a direction away from the main body, and a portion of the first conductive member beyond the second conductive member is welded to the electrode leads.

In some embodiments, the first conductive member comprises a first connection portion and a second connection portion. The first connection portion is welded to the second portion to form the first sub-welding area, and an end of the first connection portion away from the main body extends beyond the second portion. The second connection portion extends from the end of the first connection portion away from the main body, is bent relative to the first connection portion, and is welded to the electrode lead. The second conductive member is welded to an area of the first connection portion beyond the second portion.

In some embodiments, multiple electrical guide portions are provided and arranged along a thickness direction of the electrode assembly, multiple conductive structures are provided, and each electrical guide portion is connected to a corresponding conductive structure. An angle between the inclined area of the outermost electrical guide portion and the main body is from 100 degrees to 160 degrees in the thickness direction of the electrode assembly.

In some embodiments, the packaging bag is provided with a top wall and a first side wall, the top wall is located on a side of the electrode assembly along the thickness direction, and the first side wall extends from an edge of the top wall and is located on a side of the electric guide portion away from the main body. The first side wall is arranged obliquely with respect to the top wall, and an angle between the first side wall and the top wall is smaller than the angle between the inclined area of the outermost electrical guide portion and the main body.

In some embodiments, a surface of the first welding area is provided with an insulating glue.

Beneficial effects of the present disclosure are as follows: a thickness of the conductive layer can be reduced by providing the insulating substrate in the present disclosure. When a foreign object pierces the electrode member of the secondary battery, as the conductive layer has a small thickness, the conductive layer generates a small burr at a part pierced by the foreign object, and it is difficult to pierce the separator, thereby reducing a risk of short circuit and improving safety performance. In the present disclosure, space occupied the first welding area is reduced and energy density of the secondary battery is improved by the first welding area obliquely arranged.

BRIEF DESCRIPTION OF THE DRAWINGS

In order to explain technical solutions of embodiments of the present disclosure more clearly, drawings that need to be used in the embodiments of the present disclosure will be briefly introduced below. Obviously, the drawings described below are only some embodiments of the present disclosure. For those skilled in the art, other drawings can be obtained based on the drawings without creative work.

Reference signs are described as follows:

1 electrode assembly;
11 first electrode member; 111 insulating substrate; 112 conductive layer; 112a first portion; 112b second portion; 113 active material layer; 114 conductive structure; 1141 first conductive member; 1141a first connection portion; 1141b second connection portion; 1142 second conductive element; 115 insulating glue;
12 second electrode member;
13 separator;
2 packaging bag; 21 packaging film; 211 protective layer; 212 metal layer; 213 connection layer; 214 top wall; 215 first side wall; 216 second side wall; 217 extension wall; 22 seal portion;
3-electrode lead;
4 insulator;
P1 main body; P2 electric guide portion; P21 inclined area; P22 transition area;
W1 first welding area; W11 first sub-welding area; W12 second sub-welding area; W2 second welding area; W3 third welding area;
X length direction; Y width direction; Z thickness direction.

DETAILED DESCRIPTION

Below, the present disclosure will be further described in detail with reference to accompanying drawings and embodiments to make purposes, technical solutions and advantages of the present disclosure clear. It should be understood that the particular embodiments described are intended to illustrate the present disclosure and are not intended to limit the present disclosure.

In the description of the present disclosure, it should be noted that, unless otherwise stated, the terms "first", "second", "third" and the like are used for descriptive purposes only and are not to be construed as indicating or implying relative importance; the meaning of "a plurality" and the like is two or more (including two). Unless otherwise stated, the term "connected" is to be understood broadly, and may be, for example, a fixed connection, a detachable connection, an integral connection, an electric connection or a signal connection; the term "connected" can be a direct connection or indirect connection through an intermediate medium. The specific meaning of the above terms in the present disclosure can be understood by those skilled in the art according to actual circumstance In the description of the present disclosure, it should be understood that the orientation terms such as "upper", "lower" and the like are based on angles shown in the drawings and therefore cannot be understood to be a limitation to embodiments of the present disclosure. The present disclosure will be further described in detail below through specific embodiments in conjunction with the accompanying drawings.

The applicant found that in the nail piercing experiment, as burrs will be generated on the aluminum foil (copper foil) during the nail piercing, and directly overlap the negative electrode member (positive electrode member), thus causing short-circuit inside the positive electrode member and the negative electrode member and thus causing fire and explosion of the lithium-ion battery.

Figure 1:
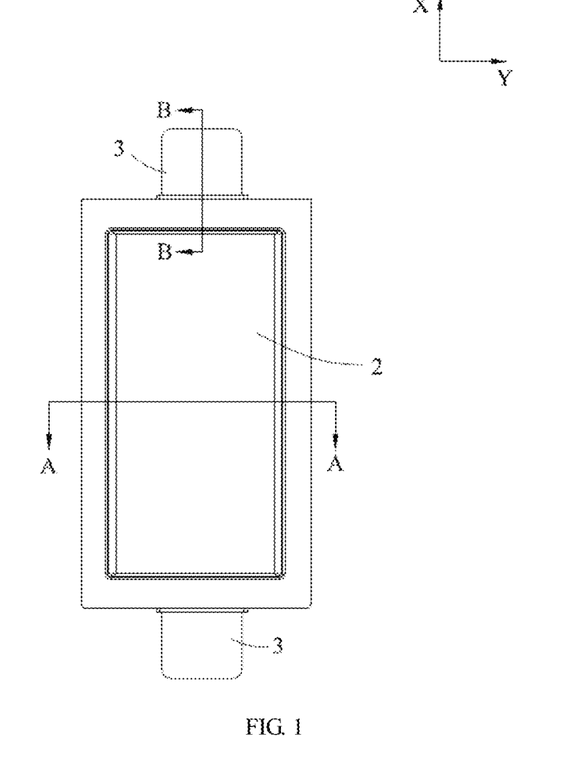
FIG. 1 is a schematic view of an embodiment of a secondary battery according to the present disclosure.
Figure 2:
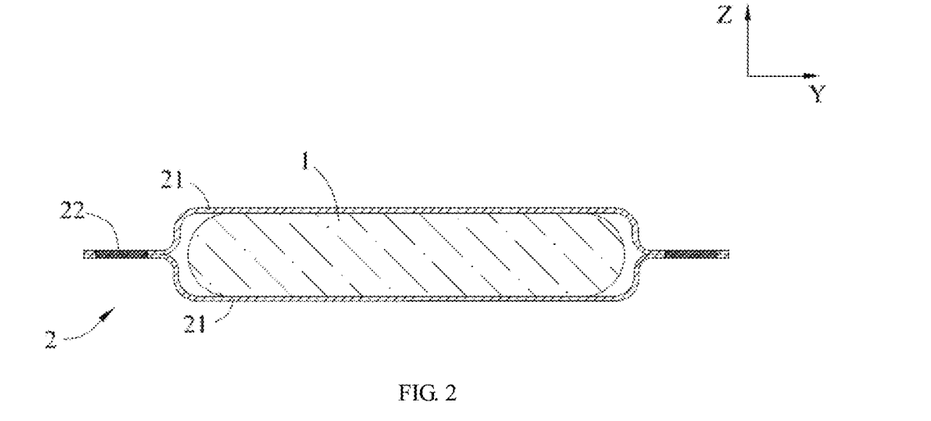
FIG. 2 is a cross-sectional view of the secondary battery taken along line A-A of FIG. 1.

Referring to FIGS. 1 and 2, the secondary battery of the present disclosure includes an electrode assembly 1, a packaging bag 2 and electrode leads 3.

Figure 3:
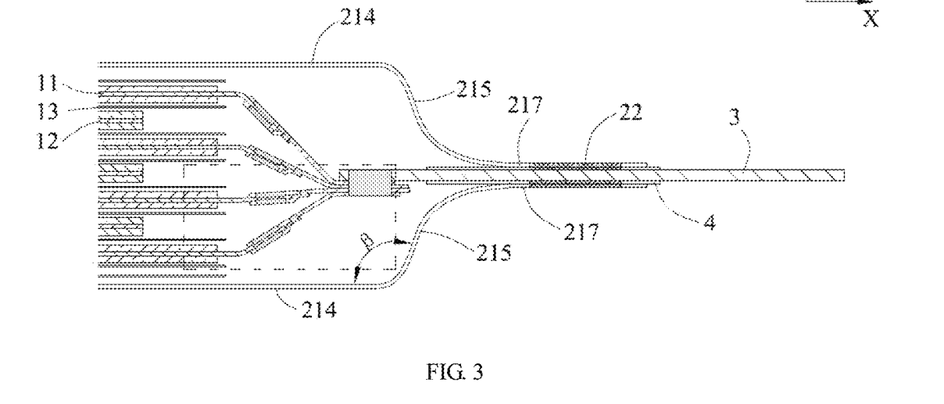
FIG. 3 is a cross-sectional view of the secondary battery taken along line B-B of FIG. 1.
Figure 4:
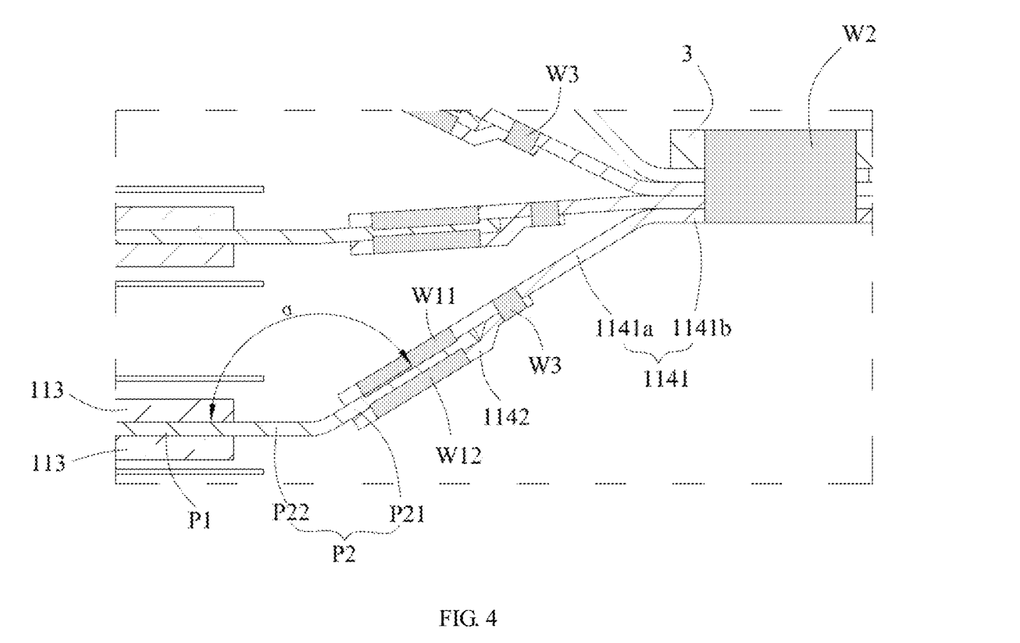
FIG. 4 is an enlarged view of FIG. 3 at a box.
Figure 5:
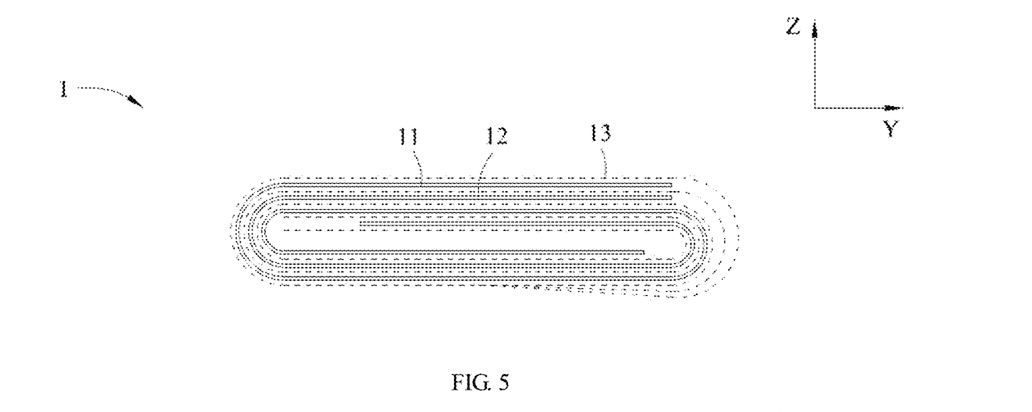
FIG. 5 is a schematic view of an embodiment of an electrode assembly of a secondary battery according to the present disclosure.

The electrode assembly 1 is a core component of the secondary battery to realize the charge and discharge function. Referring to FIGS. 3 to 5, the electrode assembly 1 includes a first electrode member 11, a second electrode member 12 and a separator 13. The separator 13 separates the first electrode member 11 and the second electrode member 12. The electrode assembly 1 is accommodated in the packaging bag 2.

In some embodiments, the electrode assembly 1 may be in a wound structure. One first electrode member 11 and one second electrode member 12 are provided, and the first electrode member 11 and the second electrode member 12 are in a belt-shaped structure. The first electrode member 11, the separator 13, and the second electrode member 12 are sequentially stacked and wound two or more turns to form the electrode assembly 1. The electrode assembly 1 is flat.

Figure 6:
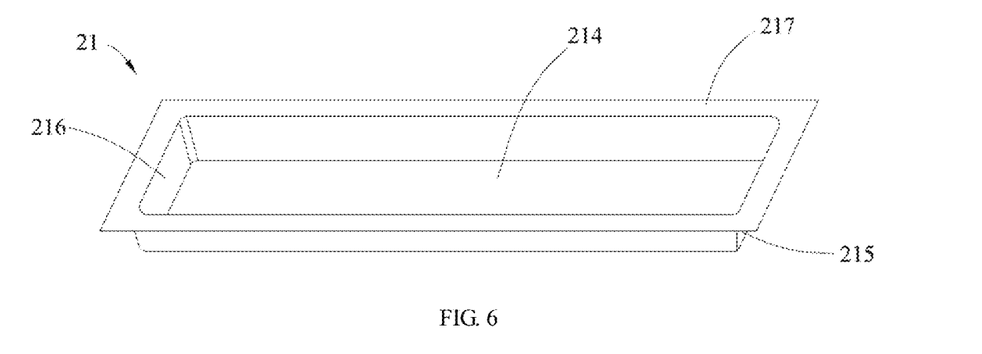
FIG. 6 is a schematic view of a packaging film of a packaging bag of a secondary battery according to the present disclosure.

Referring to FIG. 2, the packaging bag 2 includes two layers of packaging films 21. The two layers of packaging films 21 are stacked along a thickness direction Z. Referring to FIG. 6, at least one layer of packaging film 21 is provided with a cavity via stamping, and the electrode assembly 1 is located between the two layers of packaging films 21 and is accommodated in the cavity.

Figure 7:
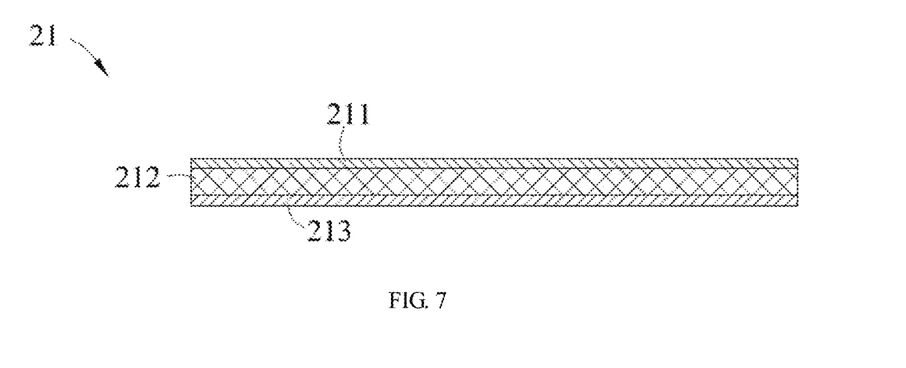
FIG. 7 is a cross-sectional view of a packaging film of a packaging bag of a secondary battery according to the present disclosure.

Referring to FIG. 7, each packaging film 21 includes a protective layer 211, a metal layer 212, and a connection layer 213. The protective layer 211 and the connection layer 213 are disposed on different sides of the metal layer 212. Exemplarily, the protective layer 211 may be fixed to a surface of the metal layer 212 away from the electrode assembly 1 via an adhesive. The connection layer 213 may be fixed to a surface of the metal layer 212 close to the electrode assembly 1 via an adhesive.

Material of the protective layer 211 may be nylon or polyethylene terephthalate. Material of the metal layer 212 may be aluminum foil or steel foil. Material of the connection layer 213 may be polypropylene.

In some embodiments, referring to FIG. 6, each packaging film 21 includes a top wall 214 and a plurality of side walls, and the top wall 214 is located on a side of the electrode assembly 1 along the thickness direction Z. A plurality of side walls extend from an edge of the top wall 214. The top wall 214 and the plurality of side walls enclose a cavity for accommodating the electrode assembly 1. Each packaging film 21 also includes an extension wall 217. The extension wall 217 extends from the edge of each of the side walls away from the top wall 214 and surrounds outside of the cavity.

The extension walls 217 of the two layers of packaging films 21 are connected to form a seal portion 22. Exemplarily, the connection layer 213 of the two layers of packaging films 21 is directly or indirectly melted and connected together at the extension wall 217 by heat pressing, thereby forming the sealed packaging bag 2. During the heat pressing process, the connection layer 213 is melted and compressed. Therefore, after the heat pressing, a thickness of the seal portion 22 is less than a sum of a thicknesses of the two layers of packaging films 21 before the heat pressing.

The electrode leads 3 are connected to the electrode assembly 1, pass through the seal portion 22 and extends to the outside of the packaging bag 2. Exemplarily, two electrode leads 3 may be provided. One electrode lead 3 is electrically connected to the first electrode member 11, and the other electrode lead 3 is electrically connected to the second electrode member 12. The two electrode leads 3 connect the electrode assembly 1 with other components outside the packaging bag 2 so as to realize charging and discharging of the electrode assembly 1. Material of the electrode leads 3 can be aluminum, nickel or copper with nickel plated.

The two electrode leads 3 can protrude from different ends of the packaging bag 2 along a length direction X, or can protrude from the same end of the packaging bag 2 along the length direction X. The electrode leads 3 are in a sheet shape and substantially parallel to the length direction X.

The electrode leads 3 pass between the two layers of packaging films 21. And as the connection layer 213 is thin, the electrode leads 3 are easily in contact with the metal layer 212, which causes a safety risk. Therefore, the secondary battery of the present disclosure is provided with the insulator 4.

In some embodiments, two insulators 4 may be provided. The two insulators 4 separate each of the two electrode leads 3 from the seal portion 22, respectively. Each insulator 4 surrounds outside of a corresponding electrode lead 3. A part of the insulator 4 is clamped between the two layers of packaging films 21 to separate the electrode lead 3 from the packaging film 21 and reduce the risk of the electrode lead 3 contacting the metal layer 212. Material of the insulator 4 may be polypropylene. As a part of the insulator 4 is clamped between the two layers of packaging films 21, when the two layers of packaging film 21 are heat-pressed, the connection layer 213 of the two layers of packaging films 21 will be melted and connected to the insulator 4.

Figure 8:
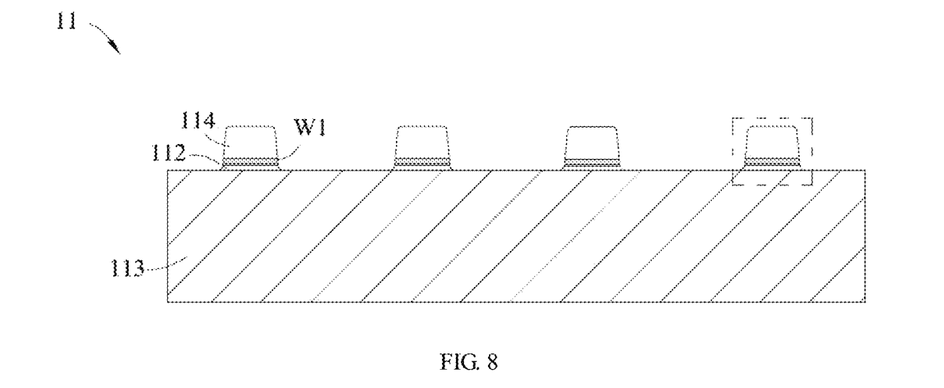
FIG. 8 is a schematic view of an embodiment of the first electrode member in an unfolded state.
Figure 9:
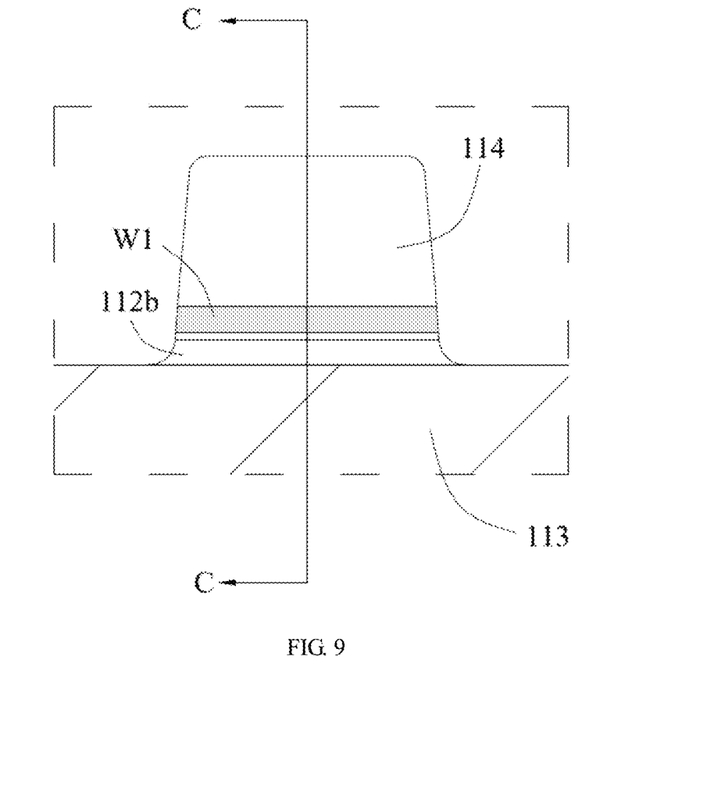
FIG. 9 is an enlarged view of FIG. 8 at a box.
Figure 10:
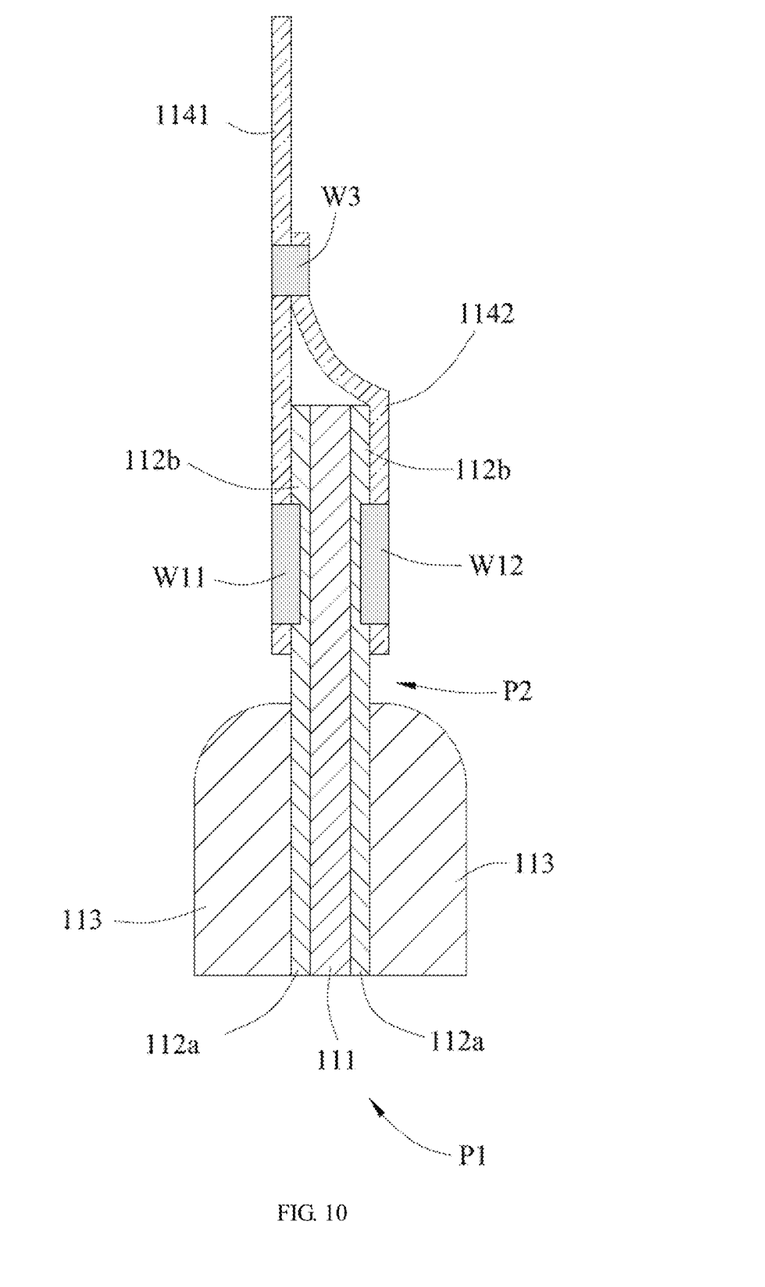
FIG. 10 is a cross-sectional view taken along line C-C in FIG. 9.

Referring to FIGS. 8 to 10, the first electrode member 11 includes an insulating substrate 111, a conductive layer 112, an active material layer 113, and a conductive structure 114.

Material of the insulating substrate 111 may be a PET (polyethylene terephthalate) film or a PP (polypropylene) film.

The conductive layer 112 is disposed on a surface of the insulating substrate 111. Material of the conductive layer 112 is selected from at least one of metal conductive material and carbon-based conductive material. The metal conductive material may be at least one of aluminum, copper, nickel, titanium, silver, nickel-copper alloy, and aluminum-zirconium alloy. The carbon-based conductive material may be at least one of graphite, acetylene black, graphene, and carbon nanotubes. The conductive layer 112 may be formed on the surface of the insulating substrate 111 by at least one of vapor deposition and electroless plating. Among them, the vapor deposition method includes physical vapor deposition (PVD), such as thermal evaporation deposition.

The conductive layer 112 includes a first portion 112a and a second portion 112b extending from the first portion 112a. The first portion 112a is coated with the active material layer 113, and the second portion 112b is not coated with the active material layer 113.

The active material layer 113 may be provided on a surface of the conductive layer 112 by coating. Active materials (such as lithium manganate, lithium iron phosphate), adhesives, conductive agents, and solvents can be made into a slurry, and then the slurry can be coated on the surface of the conductive layer 112. The slurry is cured to form the active material layer 113.

A thickness of the insulating substrate 111 may be from 1 micron (μm) to microns (μm), and a thickness of the conductive layer 112 may be from 0.1 micron (μm) to 10 microns (μm). Since the conductive layer 112 is relatively thin, burrs generated by the conductive layer 112 during cutting of the first electrode member 11 are relatively small. Thus it is difficult to pierce the separator 13 with a thickness of more than ten microns, thereby reducing a risk of short circuit and improving safety performance. In addition, when a foreign object pierces the first electrode member 11 of the secondary battery, since the thickness of the conductive layer 112 is small, the conductive layer 112 generates less burrs at a part pierced by the foreign object, and it is difficult to pierce the separator 13 so the risk of short circuit is reduced and the safety performance is improved.

A portion of the insulating substrate 111 corresponding to the first portion 112a and the first portion 112a form a main body P1. A portion of the insulating substrate 111 corresponding to the second portion 112b and the second portion 112b form an electrical guide portion P2. A plurality of electric guide portions P2 may be provided. Referring to FIGS. 3 and 4, after the electrode assembly 1 is wound into shape, the plurality of electrical guide portions P2 are arranged along the thickness direction Z.

The conductive structure 114 is welded to the second portion 112b and forms the first welding area W1. The first welding area W1 may be formed by ultrasonic welding. The electrode lead 3 is connected to the conductive structure 114 and extends to the outside of the packaging bag 2.

The electrical guide portion P2 includes an inclined area P21 that is inclined with respect to the main body P1. The main body P1 is substantially parallel to the length direction X, and the inclined area P21 is inclined with respect to the length direction X.

A first welding area W1 is at least partially located in the inclined area P21. The conductive structure 114 is welded to an area of the second portion 112b located in the inclined area P21. The first welding area is inclined with respect to the main body P1.

The first welding area W1 has poor flexibility and is difficult to be bent. Therefore, if the entire first welding area W1 is parallel to the length direction X, the first welding area W1 will occupy a larger space in the length direction X, which affects the energy density.

In the present disclosure, the first welding area W1 is arranged obliquely, so space occupied by the first welding area W1 in the length direction X can be reduced, and the energy density of the secondary battery can be improved.

Along an extension direction of the electrical guide portion P2, the first welding area W1 is spaced apart from the first portion 112a. Along the extension direction of the electrical guide portion P2, the first welding area W1 is separated from the first portion 112a by a distance. An area of the second portion 112b located between the first welding area W1 and the first portion 112a can be bent, so the first welding area W1 is arranged obliquely.

Referring to FIG. 4, the electrical guide portion P2 also includes a transition area P22. The transition area P22 is connected between the inclined area P21 and the main body P1. With respect to the transition area P22, the inclined area P21 is bent toward the electrode lead 3. By providing the transition area P22, a distance between a bending part of the electrical guide part P2 and the active material layer 113 can be ensured, a stress at a connection of the first portion 112a and the second portion 112b when the electrical guide portion P2 is bent can be reduced, and a risk of falling off of the active material layer 113 is reduced.

A surface of the transition area P22 is not covered by the conductive structure 114. In this way, it is possible to avoid bending the conductive structure 114 when bending the electrical guide portion P2, thereby reducing the bending strength.

In some embodiments, the conductive layers 112 are disposed on opposite side surfaces of the insulating substrate 111. The conductive layers 112 located on both sides of the insulating substrate 111 are separated by the insulating substrate 111. Current between the conductive layers 112 cannot be passed directly. In order to improve overcurrent capability of the electrical guide portion P, the conductive structure 114 of the present disclosure is connected to each of the conductive layers 112 located at both sides of the insulating substrate 111.

Referring to FIGS. 4 and 10, the conductive structure 114 includes a first conductive member 1141 and a second conductive member 1142. The first conductive member 1141 is connected to the second conductive member 1142. The first welding area W1 includes a first sub-welding area W11 and a second sub-welding area W12. The first conductive member 1141 is welded to an area of the second portion 112b on a side surface of the insulating substrate 111 to form the first sub-welding area W11. The second conductive member 1142 is welded to an area of a surface of the second portion 112b on the other side surface of the insulating substrate 111 to form the second sub-welding area W12. Both the first sub-welding area W11 and the second sub-welding area W12 are inclined with respect to the main body P1.

In the present disclosure, the first conductive member 1141 and the second conductive member 1142 can collect currents on the conductive layers 112 located on both sides of the insulating substrate 111 and transmit them to the electrode lead 3, thereby improving the overcurrent capability.

Along a direction away from the main body P1, the first conductive member 1141 extends beyond the second conductive member 1142, and a portion of the first conductive member 1141 beyond the second conductive member 1142 is welded to the electrode lead 3. In the present disclosure, it is only necessary to weld the first conductive member 1141 to the electrode lead 3, and it is not necessary to weld the second conductive member 1142 to the electrode lead 3. That is to say, in the present disclosure, at a welding part of the electrode lead 3 and the conductive structure 114, superposition of the first conductive member 1141 and the second conductive member 1142 in the thickness direction Z can be avoided, so welding difficulty is reduced and space is saved.

The first conductive member 1141 includes a first connection portion 1141a and a second connection portion 1141b. The first connection portion 1141a is welded to the second portion 112b to form the first sub-welding area W11, and an end of the first connection portion 1141a away from the main body P1 extends beyond the second portion 112b. The second connection portion 1141b extends from an end of the first connection portion 1141a away from the main body P1 and is bent relative to the first connection portion 1141a, and the second connection portion 1141b is welded to the electrode lead 3. The second conductive member 1142 is welded to an area of the first connection portion 1141a beyond the second portion 112b.

The second connection portion 1141b is substantially parallel to the electrode lead 3. The first connection portion 1141a is inclined with respect to the electrode lead 3. In the present disclosure, when the first conductive member 1141 is bent, the second conductive member 1142 does not need to bent, so bending difficulty is reduced.

Multiple conductive structures 114 are provided, and each electrical guide portion P2 is connected to a corresponding conductive structure 114. The second connection portion 1141b of the first conductive member 1141 of the plurality of conductive structures 114 is welded to the electrode lead 3 and forms the second welding area W2. The second conductive member 1142 is welded to the first connection portion 1141a and forms a third welding area W3.

The third welding area W3 is arranged obliquely with respect to the length direction X, so the space occupied by the third welding area W3 in the length direction X is reduced. When the second welding area W2 is formed, there is no need to weld the second conductive member 1142 of the plurality of conductive structures 114 to the electrode lead 3, so the welding difficulty is reduced and space is saved.

Referring to FIG. 4, in the thickness direction Z of the electrode assembly 1, an angle $\alpha$ is between the inclined area P21 of the outermost electrical guide portion P2 and the main body P1. The larger the value of a, the larger the space occupied by the inclined area P21 and the first welding area W1 in the length direction X, and the lower the degree of bending of the inclined area P21 with respect to the main body P1. Conversely, the smaller the value of $\alpha$, the smaller the space occupied by the inclined area P21 and the first welding area W1 in the length direction X, and the higher the degree of bending of the inclined area P21 relative to the main body P1. If the value of a is too small, the degree of bending of the inclined area P21 relative to the main body P1 is relatively high, so the second portion 112b is prone to crack at the bending part and flow capacity is thus insufficient. By comprehensive consideration of the energy density and flow capacity, the value of a can be from 100 degrees to 160 degrees.

The plurality of side walls of the packaging film 21 include a first side wall 215 and a second side wall 216. The first side wall 215 and the second side wall 216 are located on different sides of the electrode assembly 1 along the length direction X. The first side wall 215 is located on a side of the electrical guide portion P2 away from the main body P1.

Referring to FIGS. 3 and 4, the first side wall 215 is inclined with respect to the top wall 214, and an angle $\beta$ is between the first side wall 215 and the top wall 214. When a thickness of the secondary battery is constant, the larger the value of $\beta$, the smaller the size of the first side wall 215 in the length direction X, and the shorter the distance between the first side wall 215 and the inclined area P21 of the outermost electrical guide P2 in the length direction X. If the value of β is too large, the distance between the first welding area W1 and the first side wall 215 will be too small, so when the secondary battery vibrates, the burrs on the surface of the first welding area W1 will easily pierce the first side wall 215.

By an increase of the value of a, the distance between the first welding area W1 and the first side wall 215 in the length direction X can be increased. Therefore, in the present disclosure, the value of β is smaller than the value of a to reduce the risk of the first welding area W1 piercing the first side wall 215.

Figure 11:
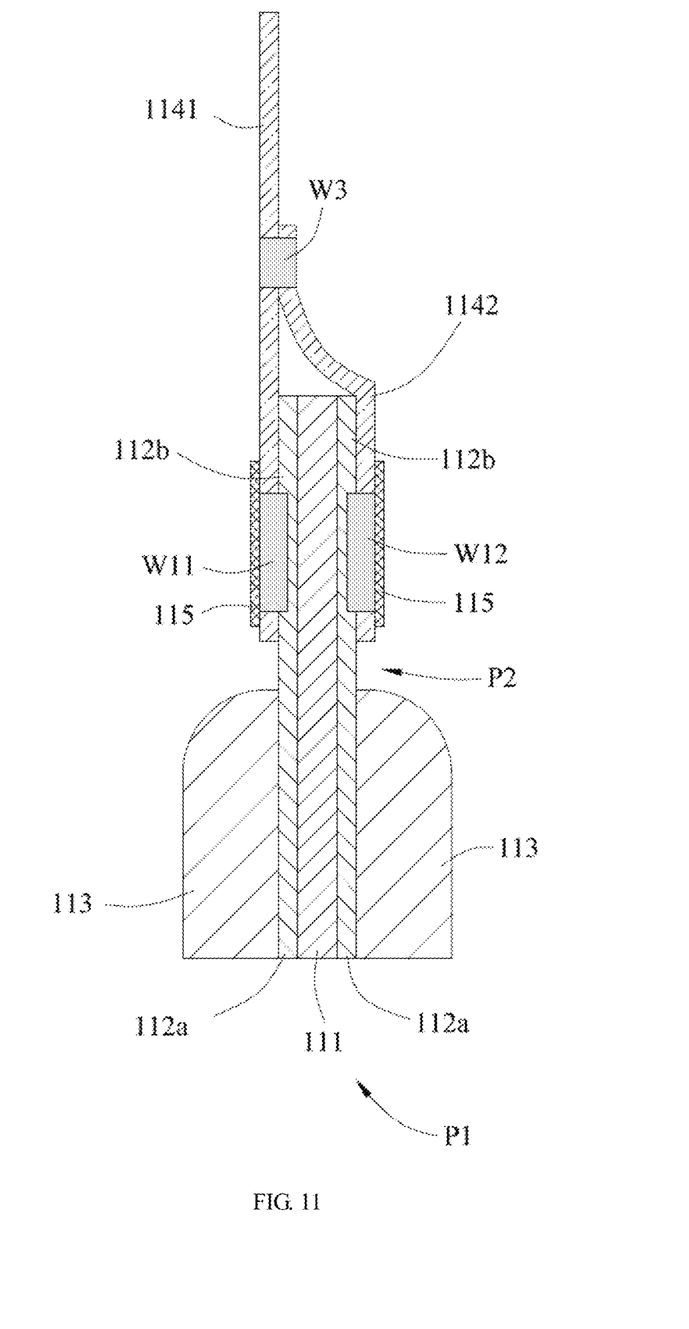
FIG. 11 is a schematic view of another embodiment of the first electrode member.

In some embodiments, referring to FIG. 11, an insulating glue 115 is provided on the surface of the first welding area W1. The insulating glue 115 can cover the burrs on the surface of the first welding area W1, so the risk of the first welding area W1 piercing the packaging film 21 or other components is reduced.

Although the present disclosure has been described with reference to preferred embodiments, without departing from the scope of the present disclosure, various improvements can be made to it and components therein can be replaced with equivalents. In particular, as long as there is no structural conflict, various technical features mentioned in various embodiments can be combined in any manner. The present disclosure is not limited to specific embodiments disclosed in the text, but includes all technical solutions falling within the scope of the claims.

What is claimed is:

1. A secondary battery, comprising an electrode assembly, a packaging bag, and electrode leads,
    wherein the electrode assembly is accommodated in the packaging bag and comprises a first electrode member, a second electrode member and a separator that separates the first electrode member from the second electrode member;
    the first electrode member comprises an insulating substrate, a conductive layer, an active material layer and a conductive structure;
    the conductive layer is provided on a surface of the insulating substrate, the conductive layer is provided with a first portion and a second portion extending from the first portion, the first portion is coated with the active material layer, the second portion is not coated with the active material layer, and the conductive structure is welded to the second portion to form a first welding area;
    the electrode leads are connected to the conductive structure and extend to an outside of the packaging bag;
    a portion of the insulating substrate corresponding to the first portion and the first portion form a main body, and a portion of the insulating substrate corresponding to the second portion and the second portion form an electric guide portion;
    the electric guide portion is provided with an inclined area arranged obliquely with respect to the main body, and the first welding area is at least partially located in the inclined area,
    the first welding area and the first portion are spaced apart along an extension direction of the electric guide portion,
    the electrical guide portion is also provided with a transition area connected between the inclined area and the main body; and
    an angle between the inclined area of the outermost electrical guide portion and the main body is from 100 degrees to 160 degrees in the thickness direction of the electrode assembly, wherein the angle is defined as an angle to be formed between an inner side surface of the inclined area of the outermost electrical guide portion and an inner side surface of the main body, and respective inner side surface is defined a side surface away from the packaging bag.

2. The secondary battery according to claim 1, wherein a surface of the transition area is not covered by the conductive structure.

3. The secondary battery according to claim 1, wherein:
    the conductive layers are arranged on opposite side surfaces of the insulating substrate;
    the conductive structure comprises a first conductive member and a second conductive member connected to each other;
    the first welding area comprises a first sub-welding area and a second sub-welding area; and
    the first conductive member is welded to an area of the second portion on a side surface of the insulating substrate to form the first sub-welding area, and the second conductive member is welded to an area of the second portion on the other side surface of the insulating substrate to form the second sub-welding area.

4. The secondary battery according to claim 3, wherein the first conductive member extends beyond the second conductive member in a direction away from the main body, and a portion of the first conductive member beyond the second conductive member is welded to the electrode leads.

5. The secondary battery according to claim 4, wherein:
    the first conductive member comprises a first connection portion and a second connection portion;
    the first connection portion is welded to the second portion to form the first sub-welding area, and an end of the first connection portion away from the main body extends beyond the second portion;
    the second connection portion extends from the end of the first connection portion away from the main body, is bent relative to the first connection portion, and is welded to the electrode lead; and
    the second conductive member is welded to an area of the first connection portion beyond the second portion.

6. The secondary battery according to claim 1, wherein: multiple electrical guide portions are provided and arranged along a thickness direction of the electrode assembly, multiple conductive structures are provided, and each electrical guide portion is connected to a corresponding conductive structure.

7. The secondary battery according to claim 6, wherein:
    the packaging bag is provided with a top wall and a first side wall, the top wall is located on a side of the electrode assembly along the thickness direction, and the first side wall extends from an edge of the top wall and is located on a side of the electric guide portion away from the main body; and
    the first side wall is arranged obliquely with respect to the top wall, and an angle between the first side wall and the top wall is smaller than the angle between the inclined area of the outermost electrical guide portion and the main body.

8. The secondary battery according to claim 1, wherein a surface of the first welding area is provided with an insulating glue.

9. The secondary battery according claim 1, wherein the packaging bag comprises two layers of packaging films stacked along the thickness direction of the electrode assembly, at least one layer of packaging film is provided with a cavity formed by stamping, and the electrode assembly is located between the two layers of packaging films and is accommodated in the cavity.

10. The secondary battery according to claim 9, wherein the packaging film comprises a protective layer, a metal layer and a connection layer, and the protective layer and the connection layer are arranged on different sides of the metal layer.

* * * * *